(No Model.)
R. A. POTTER.
PRICE INDICATOR AND PRESSURE REGULATOR FOR GAS METERS.
No. 372,928. Patented Nov. 8, 1887.
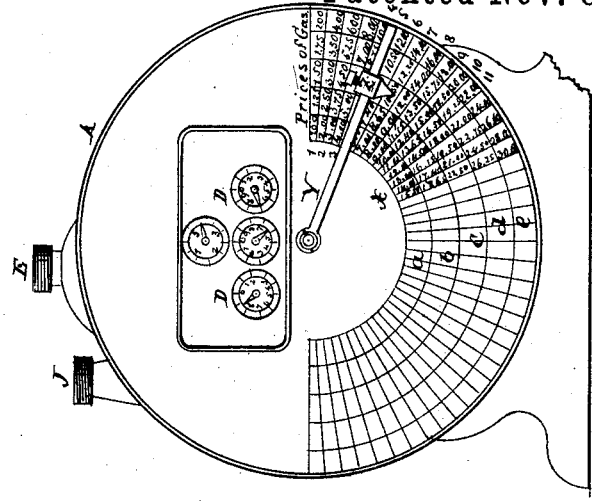
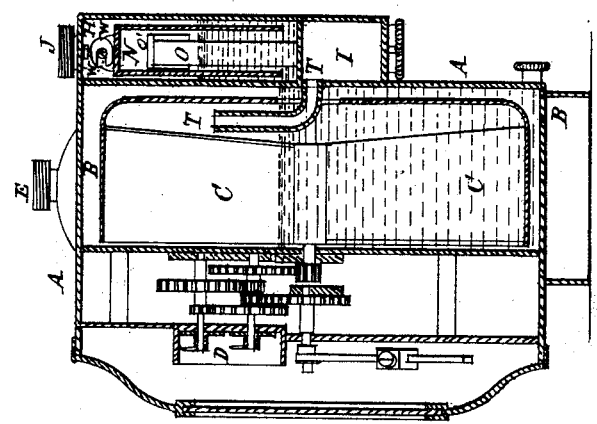
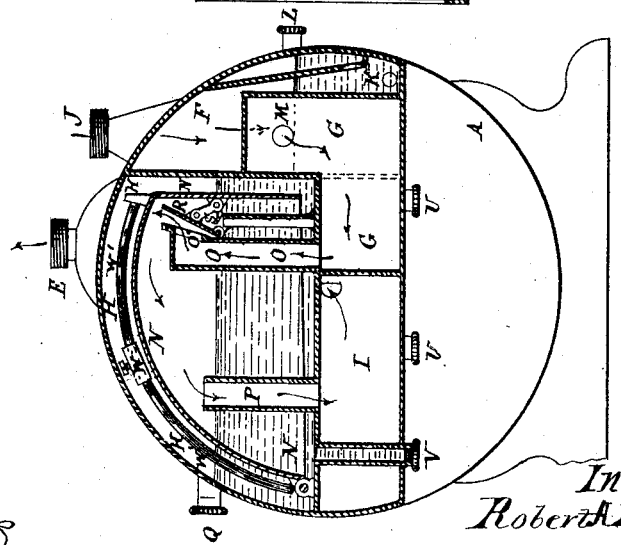
Witnesses
Inventor
Robert A. Potter.
per Reinhold Boeklen
Att'y

UNITED STATES PATENT OFFICE.

ROBERT A. POTTER, OF JERSEY CITY, NEW JERSEY, ASSIGNOR OF ONE-HALF TO EMERSON W. PERRY, OF NEW YORK, N. Y.

PRICE-INDICATOR AND PRESSURE-REGULATOR FOR GAS-METERS.

SPECIFICATION forming part of Letters Patent No. 372,928, dated November 8, 1887.

Application filed February 26, 1887. Serial No. 229,034. (No model.)

*To all whom it may concern:*

Be it known that I, ROBERT A. POTTER, a citizen of the United States of America, and a resident of Jersey City, in the county of Hudson and State of New Jersey, have invented a new and useful Improvement in Consumers' Meters, of which the following is a specification.

One essential feature of this invention relates to the combination, with the consumer's meter, of an automatic gas-account-indicating hand and a permanently-fixed graduated scale adjustable to indicate such account in money-notations for the varying prices of gas.

A secondary essential feature relates to the combination, with the meter, of a novel-constructed automatic pressure-regulating apparatus to pass the gas through the meter with a normally-regulated and suitably-reduced pressure for the economy and proper distribution of the gas from the meter to the gas-burners.

In the annexed drawings, Figure 1 represents a central longitudinal vertical section of a meter with my improvements. Fig. 2 is a front elevation of the same, the front cover shown removed. Fig. 3 is a lateral vertical section of the same, the section being taken through its regulation-chamber.

A represents the meter-case, in which is made the usual liquid-chamber, B, containing the usual meter-wheel, C, for measuring the gas and to operate the registering-wheels, and usual volume-indicating hands, D D D. The measured gas passes from the top of said chamber through the gas-outlet E from the meter for distribution to the burners. On the rear end of the meter are arranged the several flat chambers F, G, H, and I, of which the chamber F is furnished with the gas-inlet J of the meter, and said chamber communicates with the liquid-chamber B by means of the opening K, to permit the filling of the liquid-chamber from the chamber E, which is also furnished with a proof or overflow plug, L, to obtain the proper level of the liquid. Partly within the chamber F is arranged the chamber G, having a side passage, M, into the chamber F, a little above the level of the liquid in the latter chamber, permitting the gas to flow from said chamber F into the chamber G. Partly above the chamber G and above the chamber I is arranged the chamber H, in which is employed an inverted float, N, and two vertical gas-pipes, O and P, of which the pipe O is attached to the top side of the chamber G, and the pipe P to the top side of the chamber I. Said chamber H is furnished with water or other liquid, and has the overflow-plug Q, to regulate the level of said liquid. On the side of the top of the pipe O is made a flat inclined valve-seat, O', and a flat regulating-valve, R, is hinged and attached either to the pipe O or to the top of the chamber G, as shown. Said float N is hinged or pivoted to the top side of the chamber I, as shown, and the loose end or side of the float opposite the valve R has a pivoted link, S, attached to the loose end of said valve, so that by the motion caused from more or less gas-pressure above the liquid within the float said valve is caused to close or move open and allow less or more gas to flow under said float, and thereby automatically regulate the pressure of the gas. The regulated gas from under said float passes through the pipe P into the chamber I, from which it passes through the bend-pipe T into the usual gas-chamber on the rear part of the meter-wheel C. By means of the plugs U any condensation in the chambers I and G may be drawn off.

The chamber H is furnished with the plug V, for drawing the liquid from it.

In order to adjust the buoyancy of the float N to the desired pressure of the gas to be delivered from the meter, said float N is furnished with the adjustable sliding weight W, which is attached upon the curved guide-bar W', fixed over the top of the float, so that said weight may be set nearer or farther from the fulcrum of the float and secured by a suitable set-screw on said guide-bar and said buoyancy thereby obtained.

On the front side of the meter are arranged the usual dials and hands for registering the amount in cubic feet of gas passing through the meter. On the same side is arranged a permanently-fixed and semicircular dial or scale, X, and a central hand, Y, with an adjustable finger, Z. Said scale X consists of a number of semicircular spaces, *a b c d*, each to indicate the account in money for gas consumed at such a price of gas per thousand feet, and the space *a* represents the scale of account at the price of gas at one dollar per thousand feet, and the space *b* the account at the price of gas at one dollar and twenty-five cents, or the next higher price of gas, per thousand feet, and to follow with the remaining spaces in like order; and said circular spaces are divided with equally-distributed radial lines, each in radial spaces 1 2 3 4 5, commencing with the amount marked therein for the first thousand feet, and to each following the amount added of one thousand feet more than the space has marked before it, as clearly shown. The central hand, Y, is connected with the clock-work of the meter with properly-speeded gear to advance from one radial space to the following, and in like order for each thousand feet with its dials and hands D. The finger Z is adjusted and secured by its set-screw opposite the proper circular space corresponding to the price of gas per thousand feet to which the meter is applied, so that as the meter advances, and indicates the amount in feet consumed, the finger Z indicates the amount in money due for consumed gas.

What I claim as my invention, and desire to secure by Letters Patent, is—

1. The combination, with a consumer's meter and its registering train of wheels, of the hand Y, mounted on a proper shaft rotated by suitable connections from the registering train, and the arc-shaped scale X, having the price indicating divisions thereon, and a movable indicating-finger on hand Y, all substantially as specified.

2. The combination, with a gas-consumer's meter, of the regulating devices for the gas applied thereto, comprising the series of chambers F, G, and I, the chamber H, above chambers I and G, connecting with both through tubes P and O, respectively, the hinged float N and its water-seal in chamber H, surrounding tubes P and O, the adjustable weight W and its supporting-rod W′ on float N, the hinged valve R at the mouth of tube O, and the link S, pivotally connecting said valve with the end of float N, so that the movement of the latter causes valve R to regulate the passage of gas through tube O, all constructed and arranged to operate substantially as specified.

In testimony that I claim the foregoing as my invention I have signed my name, in presence of two witnesses, this 27th day of January, 1887.

ROBERT A. POTTER.

Witnesses:
WILLIAM H. CLARKSON,
A. R. FRYER.